United States Patent
Yarlott et al.

(10) Patent No.: US 9,752,208 B2
(45) Date of Patent: Sep. 5, 2017

(54) EXTRACTION SOLVENT FOR EXTRACTING METALLIC ELEMENTS, METHOD FOR PRODUCING SAME, AND METHOD FOR RECOVERING METALLIC ELEMENTS

(76) Inventors: Timothy W. Yarlott, Napa, CA (US); Kokichi Hanaoka, Nagano (JP); Hiroshi Tanaka, Shizuoka (JP); Dick Wullaert, Goleta, CA (US); Edward E. Alexander, Alameda, CA (US)

( * ) Notice: Subject to any disclaimer, the term of this patent is extended or adjusted under 35 U.S.C. 154(b) by 477 days.

(21) Appl. No.: 14/400,760

(22) PCT Filed: May 16, 2012

(86) PCT No.: PCT/JP2012/062529
§ 371 (c)(1),
(2), (4) Date: Apr. 7, 2015

(87) PCT Pub. No.: WO2013/171861
PCT Pub. Date: Nov. 21, 2013

(65) Prior Publication Data
US 2015/0218670 A1    Aug. 6, 2015

(51) Int. Cl.
| | | |
|---|---|---|
| *C22B 3/10* | (2006.01) |
| *C22B 3/26* | (2006.01) |
| *C22B 3/00* | (2006.01) |
| *C22B 7/00* | (2006.01) |
| *C22B 7/02* | (2006.01) |
| *C25B 1/00* | (2006.01) |
| *C25B 1/26* | (2006.01) |

(52) U.S. Cl.
CPC .............. *C22B 3/10* (2013.01); *C22B 3/0005* (2013.01); *C22B 7/007* (2013.01); *C22B 7/02* (2013.01); *C22B 11/04* (2013.01); *C25B 1/00* (2013.01); *C25B 1/26* (2013.01); *Y02P 10/234* (2015.11)

(58) Field of Classification Search
None
See application file for complete search history.

(56) References Cited

U.S. PATENT DOCUMENTS

2009/0315232 A1    12/2009    Kim

FOREIGN PATENT DOCUMENTS

| JP | 58-45125 A | 3/1983 |
|---|---|---|
| JP | 61-127832 A | 6/1986 |
| JP | 1990-209435 A | 8/1990 |
| JP | 2010-7183 A | 1/2010 |

OTHER PUBLICATIONS

International Search Report Dated Jun. 5, 2012, Mailed Jun. 19, 2012.
English International Search Report Dated Jun. 5, 2012, Mailed Jun. 19, 2012.

*Primary Examiner* — Melissa Swain
(74) *Attorney, Agent, or Firm* — Norris McLaughlin & Marcus P.A.

(57) ABSTRACT

The present invention provides an extraction solvent for extracting metallic elements that is characterized in that: the total concentration of chlorine (Cl2) and hypochlorous acid (HOCl) is from 20 to 1000 ppm; chlorine (Cl2) and hypochlorous acid (HOCl) are included at a molar ratio of 1:1 to 1:11; the oxidation-reduction potential is from 1100 to 1400 mV; and the pH is from 1.7 to 3.7. The present invention also provides a method for producing said extraction solvent, and a method for recovering metallic elements by using said extraction solvent.

9 Claims, 1 Drawing Sheet

EXTRACTION SOLVENT FOR EXTRACTING METALLIC ELEMENTS, METHOD FOR PRODUCING SAME, AND METHOD FOR RECOVERING METALLIC ELEMENTS

This application is a 371 application of PCT/JP2012/062529 filed May 16, 2012, the disclosure of which is incorporated by reference herein in its entirety.

TECHNICAL FIELD

The present invention relates to an extraction solvent for extracting metallic elements, a method for producing the extraction solvent, and a method for recovering metallic elements using the extraction solvent.

BACKGROUND ART

Many useful metallic elements such as precious metals and rare metals are contained in various ores, sludges, catalysts, waste electronic materials and the like, and methods for recovering metallic elements therefrom have been considered.

As the methods for recovering metallic elements such as precious metals and rare metals, an amalgam, process using mercury and a cyanidation process using a cyan-based compound are mainly used.

The smelting of gold by the amalgam process is a method including immersing gold ore in mercury to form gold amalgam, and evaporating the mercury to give gold.

The extraction of gold by the cyanidation process is conducted as follows. Firstly, gold contained in gold ore is solved by using an aqueous sodium cyanide solution to form gold cyanide ion (the following formula (1)). The gold cyanide ion is then reacted with sodium, zinc or the like to precipitate gold (the following formulas (2) and (3)). Alternatively, a solution containing gold cyanide ion is electrolysed to precipitate gold (the following formula (4)).

[Chemical Formula 1]

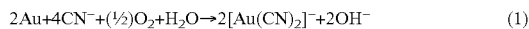

$$2Au + 4CN^- + (1/2)O_2 + H_2O \rightarrow 2[Au(CN)_2]^- + 2OH^- \quad (1)$$

[Chemical Formula 2]

$$[Au(CN)_2]^- + 2Na \rightarrow Au + 2Na^+ + 2CN^- \quad (2)$$

[Chemical Formula 3]

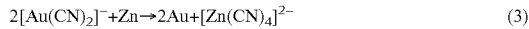

$$2[Au(CN)_2]^- + Zn \rightarrow 2Au + [Zn(CN)_4]^{2-} \quad (3)$$

[Chemical Formula 4]

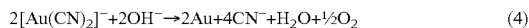

$$2[Au(CN)_2]^- + 2OH^- \rightarrow 2Au + 4CN^- + H_2O + 1/2 O_2 \quad (4)$$

Patent Literature 1 discloses a method for recovering a platinum group from a metal carrier catalyst, which is conducted by using a thiocyanate solution containing an oxidant. This method uses a cyan-based compound, and thus requires a waste water treatment.

The amalgam process and cyanidation process use mercury and a cyan-based compound, but both of these compounds are highly toxic and thus may cause environmental pollution. Therefore, it is necessary to sufficiently reduce an environmental load by using an apparatus for recovering exhaust gas and vapor, an apparatus for treating waste water, and the like. However, the cost associated with the introduction, operation and maintenance of these equipments is high.

CITATION LIST

Patent Literature

Patent Literature 1: JP 1990-209435 A

SUMMARY OF INVENTION

Technical Problem

The problem to be solved by the present invention is to provide an extraction solvent for metallic elements, which is free from hazardous substances such as mercury and cyan-based compounds, and a method for producing the extraction solvent. Furthermore, the problem is to provide a method for recovering metallic elements, which includes recovering metallic elements from various subjects to be extracted by using the extraction solvent.

Solution to Problem

The inventors did intensive studies so as to solve the above-mentioned problems and found that a solvent in which
(a) the total concentration of the dissolved chlorine gas (hereinafter also simply referred to as "$Cl_2$" and hypochlorous acid (hereinafter also simply referred to as "HClO"),
(b) the ratio of $Cl_2$ to HClO,
(c) the redox potential, and
(d) the pH
are within predetermined ranges is an extraction solvent that is suitable for the extraction of metallic elements. Since the dissociation degree of water is high in this extraction solvent, the ability of the extraction solvent to penetrate to a substance to be subjected to extraction is improved. Consequently, an excellent extraction effect is exerted.

Furthermore, the inventors found that such extraction solvent can be produced by electrolyzing an aqueous solution containing one or sore electrolyte selected from the group consisting of sodium chloride, potassium chloride, calcium chloride and magnesium chloride at a predetermined concentration, and completed the present invention.

The first present invention is an extraction solvent for extracting metallic elements according to any of the following [1] to [3].

[1] An extraction solvent for extracting metallic elements, which has a total concentration, of chlorine ($Cl_2$) and hypochlorous acid (HClO) of from 20 to 1,000 ppm, and contains the chlorine ($Cl_2$) and hypochlorous acid (HClO) at a molar ratio of from 1:1 to 1:11, has a redox potential of from 1,100 to 1,400 mV, and has a pH of from 1.7 to 3.7.

[2] The extraction solvent according to [1], which further contains ozone by from 10 to 30 ppm.

[3] The extraction solvent according to [1] or [2], which further contains bromine, iodine or a salt thereof by from 0.01 to 0.1 mol/L.

The second present invention is a method for producing the extraction solvent according to [1] according to any of [4] to [6].

[4] A method for producing the extraction solvent according to [1], including electrolyzing an electrolyte aqueous solution containing 0.01 to 0.5 mol/L of one or more electrolyte selected from sodium chloride, potassium chloride, calcium, chloride and magnesium chloride at an electrical current value of from 0.5 to 5 A/min.L by using an apparatus for producing electrolysed water.

[5] The method for producing an extraction solvent according to [4], wherein the apparatus for producing electrolysed, water is an apparatus for producing electrolysed water equipped with a diaphragm electrolytic cell.

[6] The method for producing an extraction solvent according to [4], wherein the apparatus for producing electrolysed water is an apparatus for producing electrolysed water equipped with a diaphragm electrolytic cell.

The third present invention is a method for recovering metallic elements according to any of the following [7] to [9], which is conducted by using the extraction solvent according to any of the above-mentioned [1] to [3].

[7] A method for recovering metallic elements, including the steps of:

bringing the extraction solvent according to any one of [1] to [3] into contact with a substance to be subjected to extraction containing metallic elements to extract the metallic elements from the subject to thereby give a metallic element solution, and recovering the metallic elements from the metallic element solution.

[8] The method for recovering metallic elements according to [7], wherein the metallic elements are metallic elements belonging to Group 1, Group 2, Group 5, Group 6, Group 7, Group 8, Group 13 and Group 14.

[9] The method for recovering metallic elements according to [7], wherein the metallic elements are gold, silver or platinum-group elements.

Advantageous Effects of Invention

Since the extraction solvent of the present invention does not contain hazardous substances such as mercury and cyan-based compounds, the waste water is easily treated, and the environmental burden is small. Furthermore, since most of the extraction solvent of the present invention is water, various metallic elements can be efficiently recovered without selecting the kind and characteristic of the substance to be subjected to extraction. Therefore, the cost for recovering the metallic elements is reduced.

Since the method for producing an extraction solvent and the method for recovering metallic elements according to the present invention do not use hazardous substances such as mercury and cyan-based compounds, the methods can be carried out without disposing special exhaust gas recovery apparatus and waste water treatment apparatus, and the like.

Figure 1:
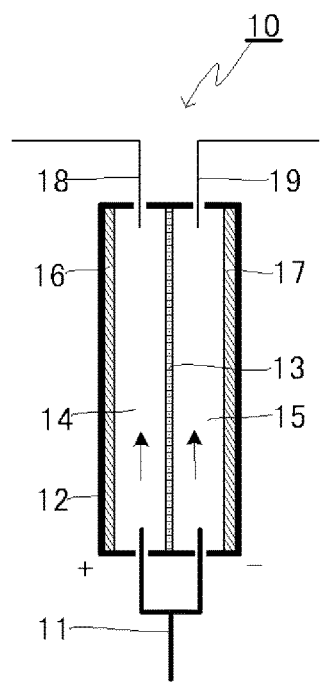
FIG. 1 is a conceptual drawing showing the basic structure of an apparatus for producing electrolysed water equipped with a diaphragm electrolytic cell.

REFERENCE SIGNS LIST 10, 20 Apparatus for producing electrolyzed water
11, 21 Electrolysis raw water supply pipe
12 Diaphragm electrolytic cell
13 Diaphragm
14 Anode chamber
15 Cathode chamber
16, 26 Anode plate
17, 27 Cathode plate
18 Anode electrolysed water extraction pipe
19 Cathode electrolyzed water extraction pipe
22 Diaphragmless electrolytic cell
24 Mixed electrolysis chamber
28 Mixed electrolyzed water-extraction pipe

DESCRIPTION OF EMBODIMENTS (Extraction Solvent for Extracting Metallic Elements)

The extraction solvent for extracting metallic elements of the present invention (hereinafter also referred to as "the present extraction solvent") contains $Cl_2$ and $HOCl$ at a ratio of from 1:1 to 1:11 by molar ratio in water and has a total concentration of the $Cl_2$ and $HOCl$ of from 20 to 1,000 ppm, has a pH of from 1.7 to 3.7, and has a redox potential of from 1,100 to 1,400 mV. The present extraction solvent is produced by electrolyzing an aqueous solution containing one or more electrolyte selected from the group consisting of sodium chloride, potassium chloride, calcium, chloride and magnesium chloride by from 0.01 to 0.5 mol/L (see below).

The ratio of the $Cl_2$ and $HOCl$ contained in the present extraction solvent is from 1:1 to 1:11 by a molar ratio, and is preferably from 1:2 to 1:10, especially preferably from 1:3 to 1:9. In the case when $HOCl$ to 1 mol of $Cl_2$ is less than 1 mol, $HClO$ is too small and the oxidizing effect is insufficient, and thus the metallic elements cannot be sufficiently extracted from the substance to be subjected to extraction. In the case when $HOCl$ to 1 mol of $Cl_2$ is greater than 11 mol, $Cl_2$ is too small and the chlorinating effect is insufficient, and thus the metallic elements cannot be sufficiently extracted from the substance to be subjected to extraction.

The total concentration of the $Cl_2$ and $HOCl$ in the present extraction solvent is from 20 to 1,000 ppm, preferably from 40 to 900 ppm, and especially preferably from 80 to 800 ppm. In the case when the concentration is less than 20 ppm, the oxidizing effect and chlorination effect are insufficient, and thus the metallic elements cannot be sufficiently extracted. In the case when the concentration exceeds 1,000 ppm, it is not cost efficient since a high electrical current is required for the electrolysis, or a long electrolysis time is required.

The present extraction solvent has a pH of from 1.7 to 3.7, preferably from 1.8 to 3.2, especially preferably from 2.0 to 3.0. In the case when the pH is less than 1.7, the ratio of the $HClO$ to $Cl_2$ becomes too small and the oxidizing effect is insufficient, and thus the metallic elements cannot be sufficiently extracted. In the case when the pH exceeds 3.7, the ratio of the $HClO$ to $Cl_2$ becomes too high and the chlorination effect is insufficient, and thus the metallic elements cannot be sufficiently extracted.

The redox potential of the present extraction solvent is from 1,100 to 1,400 mV, preferably from 1,150 to 1,350 mV, especially preferably from 1,200 to 1,300. In the case when the redox potential is less than 1,100 mV, the concentration of the free chlorine for the chlorination is too small. In the case when the redox potential exceeds 1,400 mV, the amount of the generated free chlorine levels off. The redox potential is a value that is measured by using a standard hydrogen electrode as a criterion.

The hypochlorous acid used in the chlorination reaction also acts as an oxidant, and thus is relatively unstable and tend to decrease over time. In order to suppress this, it is preferable that 10 to 30 ppm of ozone is dissolved in the present extraction solvent, and it is especially preferable that 12 to 25 ppm of ozone is dissolved.

The present extraction solvent contains bromine, iodine or a salt thereof by preferably from 0.01 to 0.1 mol/L, especially preferably from 0.05 to 0.08 mol/L. Examples of the bromine, iodine or a salt thereof include bromine, sodium, bromide, iodine and sodium iodide. Two or more kinds of these can be used in combination.

Although the present extraction solvent does not prevent incorporation of a surfactant, an organic solvent and the like, it is preferable that the extraction solvent does not contain any of surfactant, organic solvent and the like since the waste liquid treatment becomes complex.

(Method for Producing Extraction Solvent)

The present extraction solvent is produced by electrolyzing an aqueous electrolyte solution containing one or more electrolyte selected from sodium chloride, potassium, chloride, calcium, chloride and magnesium chloride by 0.01 to 0.5 mol/L (hereinafter referred to as "electrolysis raw water") by using an apparatus for producing electrolysed water at an electrical current value of from 0.5 to 5 A/min.L (this means that electrolysis is conducted at the flow rate of the electrolysis raw water of 0.5 to 5 A per 1 L/min) by using an apparatus for producing electrolysed water.

The electrolysis raw water containing chlorine in the form of Cl$^-$ and the like forms free chlorine by being electrolysed. The free chlorine is dissolved chlorine ($Cl_2$), hypochlorous acid (HClO) and hypochlorite ion (ClO$^-$), and these are present in an equilibrium state in an aqueous solution. Furthermore, the ratio of the presence of these varies depending on the temperature and pH of the aqueous solution.

As the apparatus for producing electrolysed water, an apparatus for producing electrolysed water equipped with a diaphragm electrolytic cell or a diaphragmless electrolytic cell is exemplified.

As the apparatus for producing electrolysed water equipped with a diaphragm electrolytic cell, a known apparatus can be used, and for example, an apparatus explained below can be used.

FIG. 1 is a schematic constitutional drawing showing a constitutional example of an apparatus for producing electrolyzed water equipped with a diaphragm electrolytic cell.

In FIG. 1, 10 is an apparatus for producing electrolysed water, and 12 is a diaphragm electrolytic cell. The diaphragm electrolytic cell 12 has a box-like shape with a hollow inner part. In the inside of the diaphragm electrolytic cell 12, an anode plate 16 and a cathode plate 17 are disposed in parallel with opposing side walls. The inside of the diaphragm electrolytic cell 12 are separated into two spaces by a diaphragm 13 that is disposed in parallel with the opposing side walls, and an anode chamber 14 is formed on the anode side and a cathode chamber 15 is formed on the cathode side. An electrolysis raw water supply pipe 11 that is configured to feed an electrolysis raw water (this means an aqueous electrolyte solution before undergoing electrolysis) to the insides of the anode chamber 14 and the cathode chamber 15, respectively, is connected to the diaphragm electrolytic cell 12. An anode electrolyzed water extraction pipe 18 that is configured to extract anode electrolysed water from the inside of the anode chamber 14 and a cathode electrolyzed water-extraction pipe 19 that is configured to extract cathode electrolysed water from the inside of the cathode chamber 15 are connected to the diaphragm electrolytic cell 12.

Next, the operations of the respective parts in the production of electrolyzed water by using the apparatus for producing electrolyzed water 10 described in FIG. 1 will be explained. The arrows in FIG. 1 show the flow direction of water in the apparatus. The electrolysis raw water that is fed from one end of the electrolysis raw water-feeding pipe 11 is fed into the anode chamber 14 and into the cathode chamber 15, respectively. The electrolysis raw water that is fed into the anode chamber 14 and into the cathode chamber 15 is electrolysed by a DC voltage current that is applied to the anode plate 16 and the cathode plate 17.

By the electrolysis, cathode electrolysed water is generated in the anode chamber 14, and cathode electrolysed water is generated in the cathode chamber 15. The anode electrolyzed water is taken out of the apparatus through the anode electrolysed water extraction pipe 18. This anode electrolyzed water is the present extraction solvent mentioned above. The cathode electrolysed water is taken out of the apparatus through the cathode electrolyzed water extraction pipe 19. This cathode electrolysed water is utilized as alkaline electrolysed water in various applications.

As the apparatus for producing electrolysed water equipped with a diaphragmless electrolytic cell, a known apparatus can be used, and for example, an apparatus explained below can be used.

Figure 2:
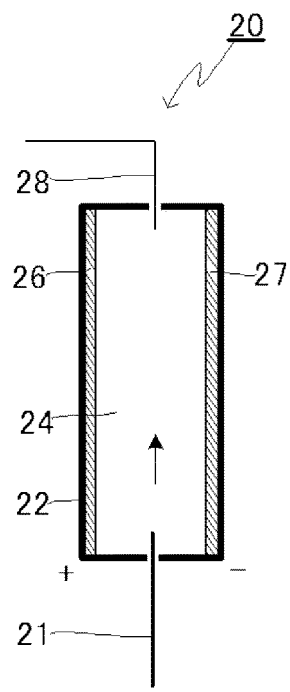
FIG. 2 is a conceptual drawing showing the basic structure of an apparatus for producing electrolyzed water equipped with a diaphragmless electrolytic cell.

FIG. 2 is a schematic constitutional drawing showing a constitutional example of an apparatus for producing electrolysed water equipped with a diaphragmless electrolytic cell.

In FIG. 2, 20 is an apparatus for producing electrolyzed water, and 22 is a diaphragmless electrolytic cell. The diaphragmless electrolytic cell 22 has a box-like shape with a hollow inner part. In the inside of the diaphragmless electrolytic cell 22, an anode plate 26 and a cathode plate 27 are disposed in parallel with opposing side walls. A mixed electrolysis chamber 24 is formed inside of the diaphragmless electrolytic cell 22. An electrolysis raw water feeding pipe 21 that is configured to feed an electrolysis raw water to the inside of the mixed electrolysis chamber 24 is connected to the diaphragmless electrolytic cell 22. A mixed electrolysed water-extraction pipe 28 that is configured to extract the mixed electrolysed water from the inside of the mixed electrolysis chamber 24 is connected to the diaphragmless electrolytic cell 22.

Next, the operations of the respective parts in the production of electrolysed water by using the apparatus for producing electrolysed water 20 described in FIG. 2 will be explained. The arrow in FIG. 2 shows the flow direction of water in the apparatus. The electrolysis raw water that is fed from one end of the electrolysis raw water feeding pipe 21 is fed into the mixed electrolysis chamber 24. The electrolysis raw water fed into the mixed electrolysis chamber 24 is electrolyzed by a DC voltage current that is applied to the anode plate 26 and the cathode plate 27.

By the electrolysis, mixed electrolyzed water is generated in the mixed electrolysis chamber 24. The mixed electrolyzed water is taken out of the apparatus through the mixed electrolysed water-extraction pipe 28. In the case when the pH of the electrolysis raw water is neutral, the pH of the obtained mixed electrolyzed water is also approximately neutral. This mixed electrolyzed water turns into the present extraction solvent by being adjusted to be within the range of pH of from 1.7 to 3.7 by using a known pH adjusting agent. Examples of the pH adjusting agent include hydrochloric acid, nitric acid, sulfuric acid and acetic acid.

The anode plates 16 and 26 and the cathode plates 17 and 27 are each formed by an electrochemically-inert metallic material. As the metallic material, platinum, platinum alloys and the like are preferable. These electrode plates each has a thickness of preferably from 0.1 to 2.0 mm, especially preferably from 0.5 to 1.5 mm. The gap between the anode plate and the cathode plate is from 3.0 to 1.0 mm, preferably from 2.0 to 1.0 mm.

As the diaphragm 13, diaphragms that have been conventionally used as electrolysis diaphragms such as ion exchange membranes and uncharged membranes can be suitably used. For example, a non-charged membrane manufactured by W. L. Gore & Associates, Inc. (trade name: Gore-Tex SGT-010-135-1) is used.

The value of the electrical current during the electrolysis is from 0.5 to 5 A, preferably from 1 to 4 A, especially preferably from 2 to 3 A in terms of flow rate with respect to the electrolysis raw water per 1 L/min. In the case when the value is less than 0.5 A, the total concentration of the $Cl_2$ and $HClO$ in the obtained electrolysed water cannot be set to be 20 ppm or more. In the case when, the value exceeds 5 A, the metallic fatigue of the electrodes is excessively progressed. Furthermore, it is also necessary to take a countermeasure against the gas that is generated by the electrolysis.

In the electrolysed water produced at this electrical current value, the pH, redox potential, concentration of free chlorine and the like have been significantly changed as compared to the electrolysis raw water. Specifically, free chlorine is formed as shown in the following formulas (5) to (8) in the electrolysis raw water in the vicinity of the anode of the apparatus for producing electrolyzed water. This free chlorine oxidizes and chlorinates the various metallic elements included in the substance to be subjected to extraction by the reactions shown in the following formulas (9) to (11) to thereby ionizes, i.e., dissolves the metallic elements.

[Chemical Formula 5]

$$NaCl \rightarrow Na^+ + Cl^- \quad (5)$$

[Chemical Formula 6]

$$2H_2O \rightleftharpoons 4H^+ + O_2 + 4e^- \quad (6)$$

[Chemical Formula 7]

$$2Cl^- \rightleftharpoons Cl_2 \quad (7)$$

[Chemical Formula 8]

$$Cl_2 + H_2O \rightleftharpoons HOCl + HCl \quad (8)$$

[Chemical Formula 9]

$$3Cl_2 + 2M \rightarrow 2MCl_3 \quad (9)$$

[Chemical Formula 10]

$$MCl_3 + HCl \rightarrow HMCl_4 \quad (10)$$

[Chemical Formula 11]

$$2HMCl_4 + HOCl \rightleftharpoons H^+ + 2(MCl_4)^- + H_2O + \tfrac{1}{2}Cl_2 \quad (11)$$

[Method for Recovering Metallic Elements]

Next, the method for recovering metallic elements using the present extraction solvent will be explained.

Firstly, the present extraction solvent is brought into contact with a substance to be subjected to extraction containing metallic elements to allow the lixiviation of the metallic elements in the subject into the present extraction solvent, whereby a metallic element solution is obtained. The metallic elements are then recovered from this metallic element solution.

The temperature of the present extraction solvent that is brought into contact with the substance to be subjected to extraction is preferably 60° C. or less, especially preferably 50° C. or less. When the temperature of the extraction solvent exceeds 60° C. it is not preferable since the $Cl_2$ and $HClO$ contained in the extraction solvent decrease.

The substance to be subjected to extraction may be any substance as long as it is a substance containing metallic elements. Examples of the substance to be subjected to extraction include various sludges; waste catalysts; waste electronic materials such as electronic substrates and IC chips; ores such as mill tailings (tailings); and burned ashes thereof.

The form of the substance to be subjected to extraction may be any form, and a fine form is preferable since the extraction efficiency is high. The substance to be subjected to extraction may also be pulverized by using a known pulverizer such as a ball mill, a hammer mill and a Henschel mixer. The average particle size of the substance to be subjected to extraction is preferably from 1 μm to 20 mm, especially preferably from 1 μm to 10 mm, and even more preferably from 1 μm to 1 mm on the volume basis.

The substance to be subjected to extraction may be brought info contact with the present extraction solvent by any means, and for example, there is a method in which the substance to be subjected to extraction is immersed in the present extraction solvent and stirred. Alternatively, there is a method in which the present extraction solvent is sprayed onto the substance to be subjected to extraction. The time for the contact of the substance to be subjected to extraction with the present extraction solvent may be preset to be a time in which a desired recovery rate can be achieved, and for example, the time is set to about from 5 minutes to 24 hours from the viewpoint of cost efficiency.

Thereafter the substance to be subjected to extraction and the present extraction solvent in which the metallic elements are dissolved (metallic element solution) are subjected to solid-liquid separation by a known method such as filtration and centrifugation. Next, the metallic elements dissolved in the metallic element solution are recovered. As the method for recovering the metallic elements from the metallic element solution, methods by adding various precipitants, methods by bringing into contact with ion exchange resins, methods by electrodeposition, and methods including removing water content and then smelting residues are exemplified. It is also possible to selectively recover the respective metallic elements by adjusting the kinds of the precipitant and ion exchange resin, the electrical current value during the electrodeposition, and the like.

Besides the above-mentioned methods, a method of feeding the substance to be subjected to extraction and the electrolysis raw water together to an electrolysis cell equipped with a pair of electrodes may be adopted. According to this method, it is possible to produce the present extraction solvent, and to simultaneously extract the metallic elements from the substance to be subjected to extraction. In this case, in the case when a diaphragm electrolytic cell is used, continuous extraction can be conducted by feeding the substance to be subjected to extraction and the electrolysis raw water together to the anode chamber. In the case when diaphragmless electrolysed water is used, continuous extraction can be conducted by feeding the substance to be subjected to extraction, together with electrolysis raw water to which a pH adjusting agent has been added in advance so that the pH after the electrolysis is within the range of the present invention, to the mixed electrolysis chamber.

EXAMPLES

Hereinafter the present invention will be explained with referring to Examples and Comparative Examples, but the present invention is not limited to these Examples. The respective characteristics shown in Examples and Comparative Examples were measured according to the following methods.

(Measurement of Metal Ion Concentration)

The metal ion concentration was measured by using an ICP emission spectrophotometric analyzer (Type: Elan 5000 ICP/MS/ES, manufactured by Perki-Elmer).

(Recovery Rate)

The recovery rate was calculated from the concentration (ppb) of each metallic element extracted by the present extraction solvent with respect to the sample of the substance to be subjected to extraction, and the concentration (ppb) of each metallic element that is actually contained in the sample of the substance to be subjected to extraction.

Recovery rate (%)=100×the concentration (ppb) of each metallic element extracted by the present extraction solvent with respect to the sample of the substance to be subjected to extraction/the concentration (ppb) of each metallic element that is actually contained in the sample of the substance to be subjected to extraction (Redox Potential)

The redox potential was measured by using an ORP meter (Type: Model HI9025, manufactured by Hanna Instruments).

Example 1

As a sample of a substance to be subjected to extraction, fly ash of coal used in thermal power generation, which had been formed into a micropowder of 200 mesh or less, was used. Using an apparatus for producing electrolyzed water with a diaphragm described in FIG. 1, 4 L of a 0.2 mol/L aqueous solution of sodium chloride was electrolyzed at an electrical current value of 2 A·min./L to give 2 L of anode electrolyzed water. This anode electrolyzed water had a redox potential by SHE of 1,300 mV, a pH of 2.5, a ratio of $Cl_2$/HOCl of 1:5.7, and a total concentration of $Cl_2$ and HOCl of 200 ppm. 2 L of this anode electrolysed water, i.e., the present extraction solvent was put into a reaction vessel and mixed with 2.2 kg of the sample of the substance to be subjected to extraction, and the redox potential was monitored under stirring at room temperature. The reaction was deemed to be completed at the time when she redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extraction are shown in Table 1.

Example 2

As a sample of a substance to be subjected to extraction, a boiler sludge that had been formed into a micropowder of 200 mesh or less was used. Using the diaphragmless apparatus for producing electrolyzed water described in FIG. 2, 4 L of a 0.2 mol/L aqueous solution of sodium chloride was electrolyzed at an electrical current value of 2 A·min./L to give 4 L of mixed electrolyzed water. The pH of this mixed electrolyzed water was adjusted to 2.5 by using hydrochloric acid to give the present extraction solvent having a redox potential by SHE of 1,300 mV, a ratio of $Cl_2$/HOCl of 1:5.7, and a total concentration of $Cl_2$ and HOCl of 200 ppm, 4 L of the present extraction solvent was put into a reaction vessel and mixed with 3 kg of the sample of the substance to be subjected to extraction, and the redox potential was monitored under stirring at room temperature. The reaction was deemed to be completed at the time when the redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extraction are shown in Table 1.

Example 3

As a sample of a substance to be subjected to extraction, a mill tailing (produced in Chloride, Ariz.) that had been formed into a micropowder of 200 mesh or less was used. Using the diaphragmless apparatus for producing electrolyzed water described in FIG. 2, 4 L of a 0.2 mol/L aqueous solution of sodium chloride was electrolyzed at an electrical current value of 2 A·min./L to give 4 L of mixed electrolysed water. The pH of this mixed electrolyzed water was adjusted to 2.5 by using hydrochloric acid to give the present extraction solvent having a redox potential by SHE of 1,250 mV, a ratio of $Cl_2$/HOCl of 1:5.7, and a total concentration of $Cl_2$ and HOCl of 150 ppm. 4 L of the present extraction solvent was put into a reaction vessel and mixed with 2.5 kg of a substance to be subjected to extraction, and the redox potential was monitored under stirring at room temperature. The reaction was deemed to be completed at the time when the redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extraction are shown in Table 1.

TABLE 1

| Kind of Metallic element | Example 1 | | Example 2 | | Example 3 | |
| --- | --- | --- | --- | --- | --- | --- |
| | Recovery rate (%) | Concentration (ppb) | Recovery rate (%) | Concentration (ppb) | Recovery rate (%) | Concentration (ppb) |
| Gold (Au) | 99.91 | 5 | 100 | 19 | 99.94 | 19 |
| Silver (Ag) | 98.34 | 2 | 100 | 10 | 97.90 | 10 |
| Platinum (Pt) | 95.54 | 0.1 | — | — | — | — |
| Palladium (Pd) | 95.02 | 2 | — | — | — | — |
| Copper (Cu) | 96.44 | 2 | 95.00 | 20 | — | — |

TABLE 1-continued

| Kind of Metallic element | Example 1 Recovery rate (%) | Example 1 Concentration (ppb) | Example 2 Recovery rate (%) | Example 2 Concentration (ppb) | Example 3 Recovery rate (%) | Example 3 Concentration (ppb) |
|---|---|---|---|---|---|---|
| Chromium(Cr) | 87.33 | 1 | 100 | 3 | — | 3 |
| Gallium (Ga) | 97.61 | 25 | 95.16 | 370 | 98.00 | 547 |
| Manganese(Mn) | 99.83 | 300 | 100 | 1276 | — | — |
| Nickel (Ni) | 95.23 | 50 | 53.85 | 250 | — | — |
| Lead (Pb) | 93.13 | 2 | 95.44 | 40 | — | — |
| Titanium (Ti) | 94.21 | 0.1 | 88.31 | 0.2 | — | — |
| Tungsten (W) | 91.88 | 0.1 | 50.67 | 0.2 | — | — |
| Zinc (Zn) | 96.99 | 60 | 100 | 590 | — | — |
| Zirconium(Zr) | 89.91 | 0.1 | 55.26 | 0.2 | — | — |
| Scandium (Sc) | 89.92 | 0.2 | 100 | 0.6 | — | — |
| Neodymium(Nd) | 95.31 | 0.1 | 81.93 | 0.1 | — | — |
| Cerium (Ce) | 92.82 | 0.7 | 92.86 | 1.4 | — | — |
| Yttrium (Y) | 89.92 | 0.1 | 89.89 | 0.1 | — | — |
| Dysprosium(Dy) | 81.66 | 2 | 72.92 | 20 | — | — |
| Erbium (Er) | 99.97 | 0.1 | 79.55 | 0.1 | — | — |
| Gadolinium(Gd) | 91.55 | 0.1 | 91.55 | 0.1 | — | — |
| Holmium (Ho) | 85.71 | 0.1 | 85.71 | 0.1 | — | — |
| Lanthanum(La) | 92.86 | 12 | 92.86 | 39.7 | 91.80 | 39.1 |
| Samarium (Sm) | 88.99 | 0.1 | 70.00 | 0.2 | — | — |
| Rubidium (Rb) | 84.35 | 13 | — | — | — | — |
| Iron (Fe) | 95.46 | 73 | — | — | — | — |
| Magnesium(Mg) | 97.73 | 49 | — | — | 95.60 | 443 |
| Tantalum (Ta) | 93.82 | 0.1 | 93.23 | 0.2 | 91.60 | 2270 |
| Beryllium(Be) | — | — | — | — | 91.30 | 19.4 |
| Cobalt (Co) | — | — | — | — | 91.20 | 73 |
| Lutetium (Lu) | — | — | — | — | 89.60 | 92 |
| Molybdenum(Mo) | — | — | — | — | 94.20 | 1232 |
| Niobium (Nb) | — | — | — | — | 88.20 | 145.5 |
| Rhenium (Re) | — | — | — | — | 87.80 | 60.9 |
| Antimony (Sb) | — | — | — | — | 91.30 | 943 |
| Vanadium (V) | — | — | — | — | 89.70 | 13.3 |

Example 4

As a sample of a substance to be subjected to extraction, fly ash of coal used in thermal power generation, which had been formed into a micropowder of 200 mesh or less, was used. Using a diaphragm apparatus for producing electrolysed water described in FIG. 1, 8 L of a 0.3 mol/L aqueous solution of sodium chloride was electrolysed at an electrical current value of 4 A·min./L to give 4 L of anode electrolysed water. This anode electrolysed water had a redox potential by SHE of 1,380 mV, a pH of 2.0, a ratio of $Cl_2$/HOCl of 1:2.5, and a total concentration of $Cl_2$ and HOCl of 915 ppm. 4 L of this anode electrolysed water, namely, the present extraction solvent was put into a reaction vessel and mixed with 2 kg of the sample of the substance to be subjected to extraction, and the redox potential was monitored under stirring at room temperature. The reaction was deemed to be completed at the time when the redox potential by SHE reached 300 mV or less, and the product was subjected to still standing, the solid content was removed by filtration, and the contents of the respective metal ions contained in the filtrate were analysed. The concentrations and recovery rates of the respective extracted metals with respect to the sample of the substance to be subjected to extraction ions are shown in Table 2. Since this sample contains a relatively high concentration of sulfide, the metals are difficult to be extracted, but the sample has an excellent extraction, efficiency as compared to the case when hydrochloric acid having a pH of 2.0 is used as an oxidant.

Comparative Example 1

The contents of the respective metal ions contained in the filtrate were analysed by similar operations to those of Example 4, except that the extraction solvent described in Example 4 was changed to a diluted aqueous solution of hydrochloric acid having a pH of 2.0. The concentrations and recovery rates of the respective extracted metals with respect to the sample of the substance to be subjected to extraction ions are shown in Table 2.

TABLE 2

| Kind of metallic element | Example 4 Recovery rate (%) | Comparative Example 1 Recovery rate (%) |
|---|---|---|
| Zinc (Zn) | 76.10 | 45.90 |
| Aluminum (Al) | 65.20 | 2.90 |
| Strontium(Sr) | 59.80 | 38.60 |
| Cobalt (Co) | 58.90 | 43.50 |
| Silver (Ag) | 36.10 | 6.90 |
| Iron (Fe) | 17.10 | 0.70 |
| Vanadium (V) | 51.60 | 3.30 |

Comparative Example 2

As a sample of a substance to be subjected to extraction, a mill tailing (produced in Chloride, Ariz.) that had been formed into a micropowder of 200 mesh or less was used. Using the diaphragmless apparatus for producing electrolysed water described in FIG. 2, an extraction solvent having a redox potential by SHE of 1,380 mV, a pH of 1.6, and a total concentration of $Cl_2$ and HOCl of 800 ppm was obtained. 4 L of the present extraction solvent was put into a reaction vessel and mixed with 2.5 kg of the sample of the substance to be subjected to extraction, and the redox potential was monitored under stirring at room temperature.

The reaction was deemed to be completed at the time when the redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extraction are shown in Table 3.

Comparative Example 3

As a sample of a substance to be subjected to extraction, a mill tailing (produced in Chloride, Ariz.) that had been formed into a micropowder of 200 mesh or less was used. Using the diaphragmless apparatus for producing electrolyzed water described in FIG. 2, an extraction solvent having a redox potential by SHE of 1,150 mV, a pH of 3.8, and a total concentration of $Cl_2$ and HOCl of 460 ppm was obtained. 4 L of the present extraction solvent was put into a reaction vessel and mixed with 2.5 kg of the sample of the substance to be subjected to extraction, and the redox potential was monitored under stirring at room temperature. The reaction was deemed to be completed at the time when the redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extract ion are shown in Table 3.

Comparative Example 4

As a sample of a substance to be subjected to extraction, a mill tailing (produced in Chloride, Ariz.) that had been formed into a micropowder of 200 mesh or less was used. Using the diaphragmless apparatus for producing electrolyzed water described in FIG. 2, an extraction solvent having a redox potential by SHE of 960 mV, a ph of 2.3, and a total concentration of $Cl_2$ and HOCl of 120 ppm was obtained. 4 L of the present extraction solvent was put into a reaction, vessel and mixed with 2.5 kg of the sample of the substance to be subjected to extraction, and the redox potential was monitored under stirring at room temperature. The reaction was deemed to be completed at the time when the redox potential by SHE reached 900 mV or less, and the product was subjected to still standing, the solid content was removed by filtration, and the contents of the respective metal ions contained in the filtrate were analyzed. The concentrations and recovery rates of the respective extracted metal ions with respect to the sample of the substance to be subjected to extraction are shown in Table 3.

Comparative Example 5

As a sample of a substance to be subjected to extraction, a mill tailing (produced, in Chloride, Ariz.) that had been formed into a micropowder of 200 mesh or less was used. Using the diaphragmless apparatus for producing electrolyzed water described in FIG. 2, an extraction solvent having a redox potential by SHE of 1,450 mV, a pH of 2.1, and a total concentration of $Cl_2$ and HOCl of 1,000 ppm was obtained. 4 L of the present extraction solvent was put into a reaction vessel and mixed with 2.5 kg of the sample of the substance to be subjected to extraction, and the redox potential was monitored under stirring at room temperature. The reaction was deemed to be completed at the time when the redox potential by SHE reached 900 mV or less, and the product was subjected to still standing, the solid content was removed by filtration, and the contents of the respective metal ions contained in the filtrate were analysed. The concentrations and recovery rates of the respective extracted metal ions with respect to the sample of the substance to be subjected to extraction are shown in Table 3.

TABLE 3

| Kind of metallic element | Comparative Example 2 | | Comparative Example 3 | | Comparative Example 4 | | Comparative Example 5 | |
|---|---|---|---|---|---|---|---|---|
| | Recovery rate (%) | Concentration (ppb) | Recovery rate (%) | Concentration (ppb) | Recovery rate (%) | Concentration (ppb) | Recovery rate (%) | Concentration (ppb) |
| Gold (Au) | 67.72 | 5 | 75.95 | 5 | 52.31 | 5 | 87.98 | 5 |
| Silver (Ag) | 59.61 | 2 | 68.94 | 2 | 48.61 | 2 | 84.32 | 2 |
| Platinum (Pt) | 67.35 | 0.1 | 70.23 | 0.1 | 55.07 | 0.1 | 79.08 | 0.1 |

In the cases when the pH was less than 1.7, the recovery rates of the metallic elements were extremely low. On the other hand, in the cases when the pH exceeded 3.7, the recovery rates of the metallic elements tended to decrease. In the cases when the ORP was less than 1,000 mV, the recovery rates of the metallic elements were extremely low. On the other hand, in the cases when, the ORP exceeded 1,400 mV, the recovery rates of the metallic elements tended to decrease.

Example 5

An ozone-containing extraction solvent was obtained by dissolving 15 ppm of ozone gas in an extraction solvent prepared in a similar manner to that of Example 3. The extraction solvent of Example 3 and the above-mentioned ozone-containing extraction solvent were respectively put into flasks made of glass, and the flasks were sealed tightly and stored at room temperature for 36 hours. At 36 hours after the storage, the physical properties of the respective extraction solvents were measured. The results are shown in Table 4.

TABLE 4

| | Immediately after preperation | After 36 hours | |
|---|---|---|---|
| | | Containing no ozone | Containing ozone |
| pH | 2.5 | 3.1 | 2.5 |
| ORP (mV) | 1230 | 730 | 1210 |
| $Cl_2$/HOCl | 1:5.3 | 1:10 | 1:5.7 |

In the ozone-containing extraction solvent, the respective values of the physical properties after a lapse of 36 hours varied lesser than those of the extraction solvent of Example 3. That is to say, the stability of hypochlorous acid was confirmed.

Example 6

0.06 mol of sodium bromide or sodium iodide was added to an extraction solvent prepared in a similar manner to that of Example 3, whereby a bromine-containing extraction solvent and an iodine-containing extraction solvent were respectively obtained. The respective physical properties were monitored while the metallic elements were extracted in a similar manner to that of Example 3. The physical properties of the respective extraction solvents were measured. The results are shown in Table 5.

TABLE 5

| | | Not added | 0.06 mol NaBr was added | 0.06 mol NaI was added |
|---|---|---|---|---|
| pH | Immediately after initiation | 2.5 | 2.5 | 2.5 |
| | After 1 hour | 3.3 | 2.8 | 2.7 |
| ORP (mV) | Immediately after initiation | 1250 | 1210 | 1220 |
| | After 1 hour | 920 | 1180 | 1170 |
| Total concentration of $Cl_2$ and HOCl (ppm) | Immediately after initiation | 150 | 160 | 165 |
| | After 1 hour | 48 | 120 | 135 |

It was confirmed that the effective chlorine concentration for chlorination is maintained constant by adding sodium bromide or sodium iodide.

The invention claimed is:

1. An extraction solvent for extracting metallic elements, comprising:
   a total concentration of chlorine (Cl2) and hypochlorous acid (HOCl) of from 20 to 1,000 ppm, and contains the chlorine (Cl2) and hypochlorous acid (HOCl) at a molar ratio of from 1:1 to 1:11;
   a redox potential of from 1,100 to 1,400 mV; and
   a pH of from 1.7 to 3.7.

2. The extraction solvent according to claim 1, which further contains ozone by from 10 to 30 ppm.

3. The extraction solvent according to claim 1, which further contains bromine, iodine or a salt thereof by from 0.01 to 0.1 mol/L.

4. A method for producing the extraction solvent according to claim 1, comprising electrolyzing an electrolyte aqueous solution containing 0.01 to 0.5 mol/L of one or more electrolyte selected from sodium chloride, potassium chloride, calcium chloride and magnesium chloride at an electrical current value of from 0.5 to 5 A/min.L by using an apparatus for producing electrolyzed water.

5. The method for producing an extraction solvent according to claim 4, wherein the apparatus for producing electrolyzed water is an apparatus for producing electrolyzed water equipped with a diaphragm electrolytic cell.

6. The method for producing an extraction solvent according to claim 4, wherein the apparatus for producing electrolyzed water is an apparatus for producing electrolyzed water having a diaphragmless electrolytic cell.

7. A method for recovering metallic elements, comprising the steps of:
   bringing the extraction solvent according to claim 1 into contact with a substance to be subjected to extraction containing metallic elements to extract the metallic elements from the subject to thereby give a metallic element solution, and
   recovering the metallic elements from the metallic element solution.

8. The method for recovering metallic elements according to claim 7, wherein the metallic elements are metallic elements belonging to Group 1, Group 2, Group 5, Group 6, Group 7, Group 8, Group 13 and Group 14.

9. The method for recovering metallic elements according to claim 7, wherein the metallic elements are gold, silver or platinum-group elements.

* * * * *